United States Patent [19]
Von Maessenhausen et al.

[11] Patent Number: 4,883,530
[45] Date of Patent: Nov. 28, 1989

[54] USE OF AMMONIUM SYNGENITE AS A SLOW-ACTING NITROGEN FERTILIZER

[75] Inventors: Walter Von Maessenhausen, Ludwigshafen; Vilmos Czikkely, Mannheim; Johann Jung, Limburgerhof, all of Fed. Rep. of Germany

[73] Assignee: BASF Aktiengesellschaft, Ludwigshafen, Fed. Rep. of Germany

[21] Appl. No.: 170,626

[22] Filed: Mar. 17, 1988

Related U.S. Application Data

[63] Continuation of Ser. No. 856,970, Apr. 29, 1986, abandoned.

[30] Foreign Application Priority Data

May 22, 1985 [DE] Fed. Rep. of Germany ....... 3518369

[51] Int. Cl.$^4$ .......................... C05C 3/00; C05D 9/00; C05B 3/00
[52] U.S. Cl. ............................................ 71/36; 71/31; 71/41; 71/59; 71/61; 71/63
[58] Field of Search ...................... 71/1, 31, 36, 41, 59, 71/61, 63

[56] References Cited

FOREIGN PATENT DOCUMENTS 421331 11/1925 Fed. Rep. of Germany .

OTHER PUBLICATIONS

CA 104261h, Ahmad, Feasability of a Mixed Fertilizer From Urea and Superphosphates, 1972.

Primary Examiner—Ferris H. Lander
Attorney, Agent, or Firm—Keil & Weinkauf

[57] ABSTRACT

Soils are fertilized by a method in which ammonium syngenite $(NH_4)_2SO_4 \cdot CaSO_4 \cdot H_2O$ or a mixture of finely divided ammonium sulfate, calcium sulfate, calcium nitrate, calcium chloride and/or dicalcium phosphate is applied to these soils, as a slow-acting nitrogen fertilizer, with the proviso that the molar ratio of Ca to $SO_4^{--}$ in the mixture is 1:2±10%.

3 Claims, No Drawings

USE OF AMMONIUM SYNGENITE AS A SLOW-ACTING NITROGEN FERTILIZER

This application is a continuation of application Ser. No. 856,970, filed on Apr. 29, 1986, now abandoned.

For supplying plants with the principal nutrient element nitrogen, there are commercially available fertilizers which contain the nitrogen in the form of readily soluble ammonium salts, nitrates and/or urea. These fertilizers have the disadvantage that, in addition to marked losses as a result of being washed away, damage to plants may occur, especially with high doses. For this reason, fertilizers with a delayed release of nitrogen have also been developed, and various processes for the preparation of such sustained-release fertilizers have been disclosed. These comprise, in particular, (a) providing soluble fertilizers with poorly soluble or insoluble coatings, (b) using poorly soluble substances which have a fertilizing action, (c) chemically or physically binding the nutrients to synthetic or natural carriers, or (d) using ammonium-containing or urea-containing fertilizers together with nitrification inhibitors.

The sustained-release fertilizers primarily available are poorly soluble compounds, urea/aldehyde condensates having become particularly important.

However, because of their high price, which is due to the relatively complicated production procedure, from the preparation of the starting materials to their reaction by condensation, all of the synthetic sustained-release fertilizers known to date are used only in specialized cultivation in commercial horticulture, fruit growing and landscaping, and in the amateur gardening sector.

It is an object of the present invention to provide a nitrogen fertilizer which can be prepared simply from starting materials available in excess, which, when applied to the soil, exhibits delayed release of nitrogen and which does not cause any damage to plants, even in high concentrations.

We have found that this object is achieved if ammonium syngenite or a mixture of finely divided ammonium sulfate and finely divided, hydrated or anhydrous calcium sulfate, calcium nitrate, calcium chloride and/or dicalcium phosphate is applied to the soil, with the proviso that the molar ratio of calcium to $SO_4{-}$ in the mixture is $1:2\pm10\%$.

Ammonium syngenite is a known substance of the formula $(NH_4)_2SO_4 \cdot CaSO_4 \cdot H_2O$, which can be prepared by reacting the cheaply available starting components ammonium sulfate and calcium sulfate in aqueous solutions (cf. Gmelin, vol. 28 (1961), 1328):

$$CaSO_4 + H_2O + (HN_4)_2SO_4 \rightarrow (NH_4)_2SO_4 \cdot CaSO_4 \cdot H_2O \quad (1)$$

We have found, furthermore, that instead of ammonium syngenite it is also possible to use a mixture of ammonium sulfate with the stated calcium salts of phosphoric acid, sulfuric acid, nitric acid and/or hydrochloric acid as a slow-acting fertilizer. In the case of calcium sulfate, the mixture required contains the calcium sulfate together with ammonium sulfate in a molar ratio of 1:1, while in the case of the other calcium slats, the mixtures required contain the particular calcium salt together with ammonium sulfate in a molar ratio of 1:2, since one mole of ammonium sulfate is required for converting the calcium salt to calcium sulfate. In other words, the molar ratio of calcium to $SO_4{-}$ in the mixture should be $1:2\pm10\%$.

Ammonium syngenite of the above formula has a nitrogen content of 9.8% by weight. Because it releases nitrogen slowly, no suppression of growth is detectable, even when high local concentrations occur as a result of errors in scattering.

It is of course also possible to use ammonium syngenite or the stated mixtures in combination with other substances have a fertilizing effect. Both straight fertilizers and complete fertilizers are suitable for this purpose. In particular, readily soluble nitrogen fertilizers can also be used as straight fertilizers, in order to make available to the plant not only a component having a sustained-release action but also a nitrogen component which is effective immediately. The content of these other substances possessing a fertilizing action should not exceed 60 % by weight, based on the ammonium syngenite content, in order to avoid adversely affecting the sustained-release fertilizing effet of the entire mixture. Where mixture of ammonium sulfate with the stated calcium salts other than calcium sulfate are used, these data are based on the theoretical total content of ammonium syngenite, fo example according to equations (2) to (4) below:

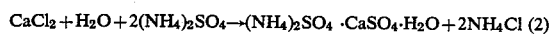

$$CaCl_2 + H_2O + 2(NH_4)_2SO_4 \rightarrow (NH_4)_2SO_4 \cdot CaSO_4 \cdot H_2O + 2NH_4Cl \quad (2)$$

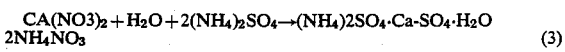

$$CA(NO_3)_2 + H_2O + 2(NH_4)_2SO_4 \rightarrow (NH_4)2SO_4 \cdot Ca\text{-}SO_4 \cdot H_2O\ 2NH_4NO_3 \quad (3)$$

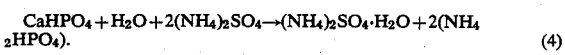

$$CaHPO_4 + H_2O + 2(NH_4)_2SO_4 \rightarrow (NH_4)_2SO_4 \cdot H_2O + 2(NH_{4\ 2}HPO_4). \quad (4)$$

The action of ammonium syngenite can easily be tested by carrying out experiments in vessles (Mitscherlich vessels). Rye grass (*Lolium perenne*) is a particularly suitable test plant, since the regeneration capacity of this plant permits several harvests (cuts) without having to alter the soil structure. In this way, absorption of the nitrogen and in particular its sustained action over a prolonged period can be monitored exactly.

The Examples which follow demonstrate the slow fertilization action of ammonium syngenite.

EXAMPLE 1

Vegetation trails with rye grass as the test plant were carried out in Mitscherlich vessels on a loamy sand soil which was brought to 60 % of the maximum water capacity. A basal dressing of secondary sodium phosphate and potassium chloride ensured an optimum P and K supply. the nitrogen doses were 1.5 and 2.5 g of N per vessel; for the moderate rate of fertilizer application of 1.5 g of N, the samples were mixed into the soil, and, for the high rate of fertilizer application comprising 2.5 g of N, the fertilizer was applied on top of the soil surface, after emergence. Ammonium syngenite was used as a granulated and compacted formulation. The development of the yield and the absorption of nutrient were monitored over 3 or 4 cuts.

Development of yield for granulated ammonium syngenite and urea at moderate rate of fertilizer application. 1.5 g of N/vessel, mixed into the soil.

|  | Number of cuts | | | Total |
|---|---|---|---|---|
|  | 1 | 2 | 3 | g of dry |
| Substance | 11 July | 10 Aug. | 20 Oct. | matter/vessel |
| without nitrogen | 11.0 | 2.5 | 2.7 | 16.2 |
| urea | 17.1* | 24.5 | 6.9 | 48.5 |
| ammonium synge- | 23.3 | 24.6 | 7.0 | 54.9 |

|  | Number of cuts | | | Total g of dry |
|---|---|---|---|---|
| Substance | 1<br>11 July | 2<br>10 Aug. | 3<br>20 Oct. | matter/vessel |
| nite, granulated | | | | |

*plant damage

While the application of urea as a fertilizer resulted in plant damage, the ammonium syngenite series were well tolerated and had a good effect on the yield, which is attributable to the slower release of nitrogen.

EXAMPLE 2

The superior plant-toleraton of ammonium syngenite was even more clearly displayed at the high rate of fertilizer application. Urea very seriously damaged the plant stock. On the other hand, ammonium syngenite produced a sustained, steady developement in the yield over 4 cuts.

Development of the yield for granulated ammonium syngenite and urea at the high rate of fertilizer application. 2.5 g of N/vessel, applied on top after emergence.

|  | Number of cuts | | | | Total g of dry matter/vessel |
|---|---|---|---|---|---|
| Substance | 1<br>11 July | 2<br>1 Aug. | 3<br>21 Aug. | 4<br>20 Oct. | |
| Control (without nitrogen) | 8.5 | 1.6 | 1.1 | 2.3 | 13.5 |
| urea | 16.7* | 5.6* | 1.3* | 3.0* | 26.6 |
| ammonium syngenite, granulated | 18.6 | 25.4 | 10.3 | 3.1 | 57.4 |

*severe plant damage

The table shows that, at nitrogen doses of 2.5 g of N/vessel, urea causes severe damage to the plants, while ammonium syngenite causes no damage. The yield falls off more slowly over the trail period than in the case of urea.

EXAMPLE 3

In another trail, a compacted ammonium syngenite sample was used. In this case too, the substantially better toleration, the slow release of nutrient and the good effect on the yield compared with pure ammonium sulfate were evident at the high rate of fertilizer application.

Development of yield for compacted ammonium syngenite and pure ammonium sulfate at the high rate of fertilizer application. 2.5 g of N/vessel, applied on top after emergence.

|  | Number of cuts | | | | Total g of dry matter/vessel |
|---|---|---|---|---|---|
| Substance | 1<br>10 Aug. | 2<br>29 Aug. | 3<br>21 Sept. | 4<br>6 Nov. | |
| Control (without nitrogen) | 7.4 | 1.9 | 1.5 | 0.7 | 11.7 |
| Ammonium sulfate | 3.5* | 6.9* | 13.2* | 16.7 | 40.3 |
| Ammonium syngenite, compacted | 9.8 | 16.6 | 15.3 | 6.4 | 48.1 |

*severe plant damage

EXAMPLE 4

The superiority of granulated ammonium syngenite in respect of nutrient absorption and nutrient utilization compared with commercial slow-acting N fertilizers was clearly evident in ths Example.

|  | Withdrawal of N, mg/vessel | | | | Total mg/vessel | Utilization, in % |
|---|---|---|---|---|---|---|
| Substance | 1<br>10 Aug. | 2<br>29 Aug. | 3<br>21 Sept. | 4<br>6 Nov. | | |
| Control (without nitrogen) | 149 | 32 | 21 | 21 | 233 | — |
| Ureaform* | 538 | 144 | 92 | 90 | 864 | 25.2 |
| Ammonium syngenite, granulated | 1099 | 1110 | 204 | 46 | 2459 | 89.0 |

*commercial ureaform fertilizer containing 38% of N

EXAMPLE 5

This Example illustrates the sustained-release fertilizing effect of an equimolar mixture of $(NH_4)_2SO_4$ and $CaSO_4 \cdot H_2O$. 2.5 g of N/vessel, applied on top after emergence

|  | Number of cuts | | | | Total g of dry matter/vessel |
|---|---|---|---|---|---|
|  | 1<br>11 July | 2<br>1 Aug. | 3<br>21 Aug. | 4<br>20 Oct. | |
| without nitrogen | 8.5 | 1.6 | 1.1 | 2.3 | 13.5 |
| Mixture of $(NH_4)_2SO_4 + CaSO_4 \cdot H_2O$ | 16.4 | 22.7 | 13.2 | 3.9 | 56.2 |

We claim:

1. A process for fertilizing soils with a sustained-released fertilizing composition by applying the composition to soils, said composition consisting of ammonium syngenite or a mixture of finely divided ammonium sulfate and finely divided hydrated or anhydrous calcium sulfate, calcium chloride and/or dicalcium phosphate, with the proviso that the molar ratio of calcium to $S_4^=$ in the mixture is 1:2±10%.
2. The process of claim 1 wherein the composition consists essentially of ammonium syngenite.
3. The composition of claim 1 wherein the composition consists of a mixture of finely divided ammonium sulfate and finely divided, hydrated or anhydrous calcium sulfate.

* * * * *